US008288678B2

(12) United States Patent
Brandt

(10) Patent No.: US 8,288,678 B2
(45) Date of Patent: Oct. 16, 2012

(54) DEVICE FOR AND METHOD OF MAINTAINING A CONSTANT DISTANCE BETWEEN A CUTTING EDGE AND A REFERENCE SURFACE

(75) Inventor: Micheal J. Brandt, Van Nuys, CA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 640 days.

(21) Appl. No.: 12/432,881

(22) Filed: Apr. 30, 2009

(65) Prior Publication Data

US 2010/0159251 A1   Jun. 24, 2010

Related U.S. Application Data

(60) Provisional application No. 61/138,756, filed on Dec. 18, 2008.

(51) Int. Cl.
*B23K 26/14* (2006.01)
(52) U.S. Cl. .......... 219/121.67; 219/121.72; 219/121.84
(58) Field of Classification Search ............. 219/121.67, 219/121.72, 121.84, 121.78, 121.68, 121.69
See application file for complete search history.

(56) References Cited

U.S. PATENT DOCUMENTS

| | | | | |
|---|---|---|---|---|
| 4,031,351 A | * | 6/1977 | Martin | 219/121.67 |
| 4,550,241 A | * | 10/1985 | Scott et al. | 219/121.67 |
| 4,610,771 A | | 9/1986 | Gillery | |
| 4,623,389 A | | 11/1986 | Donley et al. | |
| 4,806,220 A | | 2/1989 | Finley | |
| 4,894,513 A | | 1/1990 | Koontz | |
| 4,902,875 A | | 2/1990 | Koontz | |
| 4,994,650 A | | 2/1991 | Koontz | |
| 5,202,787 A | | 4/1993 | Byker et al. | |
| 5,227,606 A | * | 7/1993 | Weeks et al. | 219/121.67 |
| 5,481,083 A | * | 1/1996 | Smyth, Jr. | 219/121.67 |
| 5,675,944 A | | 10/1997 | Kerr et al. | |
| 5,821,001 A | | 10/1998 | Arbab et al. | |

(Continued)

FOREIGN PATENT DOCUMENTS

DE   224 793 A1   7/1985

(Continued)

OTHER PUBLICATIONS

PCT Search Report, PCT/US2009/066059, dated Mar. 16, 2010.

*Primary Examiner* — M. Alexandra Elve
(74) *Attorney, Agent, or Firm* — Andrew C. Siminerio

(57) ABSTRACT

A device for maintaining a cutting edge, e.g. a focused laser beam at a constant distance from a surface of the work piece as the cutting edge imposes a cut line in a coating on the surface of the work piece. The device includes a constant force spring connecting a tube to a support and a surface follower mounting an end of the tube. The positions of a surface of the surface follower and the cutting edge have a predetermined relationship to one another. Gas moving out of the tube provides a first gas bearing between the surface follower and inner surface of the tube, and gas moving through passageways in the surface follower provide a second gas bearing between the surface of the surface follower and a surface of the coating. The thicknesses of the bearings remain constant as the follower moves over the surface of the piece to maintain the cutting edge at a constant distance from the surface of the coating.

19 Claims, 6 Drawing Sheets

U.S. PATENT DOCUMENTS

| | | | |
|---|---|---|---|
| 5,938,954 A * | 8/1999 | Onuma et al. | 219/121.84 |
| 5,965,853 A | 10/1999 | Hornsey | |
| 6,310,316 B1 * | 10/2001 | Arduino et al. | 219/121.67 |
| 6,313,432 B1 * | 11/2001 | Nagata et al. | 219/121.67 |
| 6,471,360 B2 | 10/2002 | Rukavina et al. | |
| 6,667,825 B2 | 12/2003 | Lu et al. | |
| 2002/0158805 A1 * | 10/2002 | Turnbull et al. | 343/713 |
| 2004/0065651 A1 | 4/2004 | Voeltzel | |
| 2007/0002422 A1 | 1/2007 | O'Shaughnessy | |
| 2008/0041832 A1 * | 2/2008 | Sykes et al. | 219/121.84 |
| 2008/0149605 A1 | 6/2008 | Sykes | |
| 2008/0237206 A1 * | 10/2008 | Bann et al. | 219/121.73 |

FOREIGN PATENT DOCUMENTS

| | | |
|---|---|---|
| DE | 10 2004 009 950 A1 | 9/2005 |
| WO | 2007144566 A1 | 12/2007 |

* cited by examiner

DEVICE FOR AND METHOD OF MAINTAINING A CONSTANT DISTANCE BETWEEN A CUTTING EDGE AND A REFERENCE SURFACE

CROSS-REFERENCE TO RELATED APPLICATION

This application claims the benefits of U.S. Application Ser. No. 61/138,756 filed on Dec. 18, 2008, and entitled "Apparatus For And Method Of Maintaining The Distance Between Focal Point Of A Laser Beam And A Work Surface", which is hereby incorporated herein by reference.

BACKGROUND OF THE INVENTION

1. Field of the Invention

This invention relates to an device for and method of maintaining a constant distance between a cutting edge, e.g. focal point of a cutting laser beam, and a reference surface, e.g. surface of a coating on a first major surface of a sheet, to impose a cut or separation line of uniform width in the coating, and more particularly, to impose a cut or separation line having along its cut path a constant width at a constant distance from the reference surface.

2. Discussion of the Technical Problems

As is appreciated by those skilled in the art, laminated aircraft windshields can have one heating arrangement on inner surface of the outer ply, e.g. outer glass sheet, of the laminated windshield to prevent the formation of ice on outer surface of the windshield, and can have a second heating arrangement between structural plies, e.g. glass or acrylic sheets to prevent and/or to remove fog from inner surface of the windshield. The heating arrangement usually includes an electrically conductive coating, e.g. one or more coating films between a pair of bus bars connected to an electrical power source. The boundary of the conductive coating usually is spaced from the edges of the sheet and corresponds to the peripheral shape of the sheet.

One of the limitations with the presently available heating arrangements is that their use on sheets that have a non-linear or curved periphery prevents uniform distribution of the current through the electrically conductive coating that has a non-linear or curved peripheral shape. The non-uniform distribution of the current through the coating can result in hot spots in the coating, which can result in overheating of the windshield, which can result in de-lamination of the windshield. One technique to eliminate the hot spots is to segment the electrically conductive coating to provide for a more uniform current flow through the coating. The width of the cut or separation lines imposed in the coating to segment the coating is sufficiently small, e.g. but not limited to a width of 0.0015 inches (0.048 millimeters (hereinafter also referred to as "mm")) such that the operator of the aircraft looking through the windshield has minimal or no visual observation of the separation lines, and the width of the separation lines is sufficiently large such that the separation lines electrically isolate the segments from one another in the area between the bus bar.

One technique to segment the coating is to make one or more passes of a laser beam over the coating. More particularly, the focal point of the laser beam is positioned to impinge on the conductive coating at a predetermined spaced distance from a reference surface of the sheet to impose a separation line in the coating by evaporating a portion of the coating as the laser beam moves along its path. Although this technique, is acceptable for electrically conductive coatings applied to flat surfaces of sheets, there are drawbacks when the technique is practiced on coatings applied to curved surfaces of sheets. One of the drawbacks is that the distance between the focal point of the laser beam and the reference surface of the sheet varies as the surface curvature of the sheet varies. The result is that the width of the deletion line increases as the distance between the focal point of the laser beam and the reference surface decreases and vice versa. One approach to eliminate this drawback is to develop a software program to follow the contour of the curved surface of the sheet. As is appreciated by those skilled in the art, the contour of the curved surfaces of two glass sheets is not identical, requiring a software program for each sheet, which is time consuming and expensive. Another approach to eliminate the drawback is to place a member in surface contact with the surface of the coating to displace the focal point of the laser beam as the surface curvature changes. The drawback with this approach is that the member can mar the surface of the coating as the member moves the focal point of the laser beam in response to changes in the curvature of the surface of the coating.

As can now be appreciated by those skilled in the art, it would be advantages to provide a technique for imposing one or more cut lines or separation lines in a coating, e.g. an electrically conductive coating, that has a generally constant width at a constant distance from a reference surface and does not have the drawbacks of the presently available techniques.

SUMMARY OF THE INVENTION

The invention relates to a device for maintaining cutting edge of a shaping member at a constant distance from a reference surface of an article as the cutting edge moves relative to the reference surface. The device includes, among other things, a tube having a first end and an opposite second end; a constant force applying arrangement for connecting the first end of the tube to a support member, and a surface follower mounting the second end of the tube. The surface follower has a major surface facing in a direction away from the second end of the tube and a plurality of passageways. Each of the passageways has an exit at the major surface of the surface follower. The major surface of the surface follower and the cutting edge of the shaping member have a predetermined relationship to one another. An inlet is provided for moving a gas into the tube toward the second end of the tube. As the gas moves out of the second end of the tube, a first gas bearing having a first thickness is provided between outer surface portions of the surface follower and inner surface portions of the second end of the tube, and as the gas moves through the plurality of passageways, a second gas bearing having a second thickness is provided when the major surface of the surface follower and the reference surface are adjacent to one another and in facing relationship to one another. Curvatures of the reference surface of the article expand and contract the constant force arrangement to maintain the first and second thicknesses of the first and the second gas bearings, respectively, constant as the surface follower moves over the reference surface to maintain the cutting edge of the shaping member at a constant distance from the reference surface of the article.

This invention further relates to a work station for imposing a cut line or a separation line in a work piece, the work station including, among other things a table having a work support surface, and a gantry mounted over the work surface, the gantry including a support member, wherein the work support surface and the support member are moveable relative to one another. A device for maintaining cutting edge of a shaping member at a constant distance from outer major surface of the work piece is supported by the gantry and includes, among other things, a tube having a first end and an opposite second end; a constant force applying arrangement connecting the first end of the tube to the support member, and a surface follower mounting the second end of the tube. The surface follower has a major surface facing the work support surface and a plurality of passageways having an exit at the major surface of the surface follower, wherein the major surface of the surface follower and the cutting edge of the shaping member have a predetermined relationship to one another. An inlet is provided for moving a gas into the tube toward the second end of the tube, wherein as the gas moves out of the second end of the tube, a first gas bearing having a first thickness is provided between outer surface portions of the surface follower and inner surface portions at the second end of the tube, and wherein as the gas moves through the plurality of passageways, a second gas bearing having a second thickness is provided when the major surface of the surface follower and the major surface of the work piece are adjacent to one another and in facing relationship to one another. With this arrangement curvatures of the major surface of the work piece expand and contract the constant force arrangement to maintain the first and second thicknesses of the first and the second gas bearings, respectively, constant as the surface follower moves over the major surface of the work piece. With this arrangement, the cutting edge is maintained at a constant distance from the major surface of the work piece as the cutting edge moves along its path and as the surface follower moves over the major surface of the work piece.

The invention further relates to a method of imposing a cut line or separation line in a work piece, the work piece having, among other things a reference surface. The method includes, among other things providing a surface follower and a cutting surface, wherein the surface follower has a major surface having a predetermined relationship to the cutting surface; providing a gas bearing between the reference surface of the work piece and the major surface of the surface follower, wherein the gas bearing has a constant thickness; moving the work surface and the surface follower relative to one another to impose the cut line in the work piece, wherein the cut line along its length has a uniform width at a constant spaced distance from the reference surface.

A further non-limiting embodiment of the invention relates to a glass sheet having, among other things, an electrically conductive coating on a major surface of the sheet, the coating having, among other things, an electric conductive film between a pair of dielectric films, the coating having a separation line having a length that extends between sides of the sheet and imposes an electrically insulating separation or cut line only in the electrically conductive film.

DETAILED DESCRIPTION OF THE INVENTION

Figure 1:
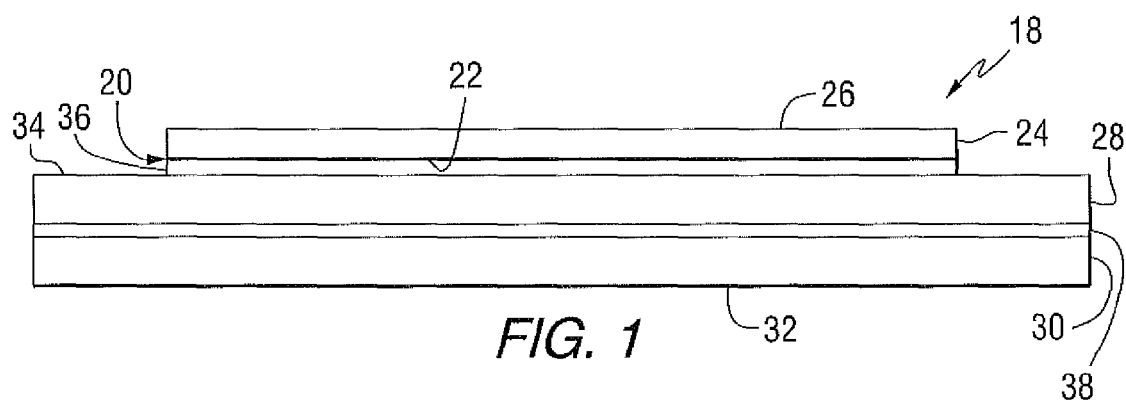
FIG. 1 is an elevated side view of an aircraft transparency that can be used in the practice of the invention.

As used herein, spatial or directional terms, such as "inner", "outer", "left", "right", "up", "down", "horizontal", "vertical", and the like, relate to the invention as it is shown in the drawing figures. However, it is to be understood that the invention can assume various alternative orientations and, accordingly, such terms are not to be considered as limiting. Further, all numbers expressing dimensions, physical characteristics, and so forth, used in the specification and claims are to be understood as being modified in all instances by the term "about". Accordingly, unless indicated to the contrary, the numerical values set forth in the following specification and claims can vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques. Moreover, all ranges disclosed herein are to be understood to encompass any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more and ending with a maximum value of 10 or less, e.g., 1 to 6.7, or 3.2 to 8.1, or 5.5 to 10. Also, as used herein, the terms "applied over", or "provided over" mean moved, applied, or provided on but not necessarily in surface contact with. For example, a material "applied over" a substrate does not preclude the presence of one or more other materials of the same or different composition located between the deposited material and the substrate, and does not preclude a sheet or layer between the device and the surface.

Before discussing non-limiting embodiments of the invention, it is understood that the invention is not limited in its application to the details of the particular non-limiting embodiments shown and discussed herein since the invention is capable of other embodiments. Further, the terminology used herein to discuss the invention is for the purpose of description and is not of limitation. Still further, unless indicated otherwise in the following discussion, like numbers refer to like elements.

Non-limiting embodiments of the invention will be directed to the practice of the invention on a component of an aircraft laminated transparency, and in particular to the heating arrangement of an aircraft windshield. The invention, however, is not limited to any particular type of aircraft transparency, and the invention contemplates the practice of the invention on components of aircraft windows of the type having a medium responsive to electric stimuli to increase or decrease visible transmission, e.g. but not limited to the type of window disclosed in U.S. Pat. Nos. 5,202,787 and 6,667,825, and U.S. Patent Application Publication 2007/0002422 A1, and on components of aircraft windows of the type having an insulated air space between a pair of laminated sheets, e.g. but not limited to the type disclosed in U.S. Pat. No. 5,965,853. The disclosure of the published documents is hereby incorporated by reference. Further, the invention can be practiced on commercial and residential windows, e.g. but not limited to type disclosed in U.S. Pat. No. 5,675,944, which patent is hereby incorporated by reference; a window for any type of land vehicle; a canopy, cabin window and windshield for any type of air and space vehicle, a window for any above or below water vessel, and a window for a viewing side or door for any type of containers, for example but not limited to a refrigerator, cabinet and/or oven door. Still further, the invention is not limited to the material of the layers or sheets of the transparency, and the layers or sheets can be made of, but not limited to, cured and uncured plastic sheets; annealed, and heat and chemically strengthened, clear, colored, coated and uncoated glass sheets.

Shown in FIG. 1 is a non-limiting embodiment of a laminated aircraft windshield 18 that can be made in accordance to the teachings of the invention. The windshield 18 includes a heating arrangement 20 provided over inner surface 22 of outer ply 24, e.g. a glass sheet, to prevent the formation of ice on outer surface 26 of the windshield 18. The number 26 also designates outer surface of the outer ply 24 of the windshield 18. Optionally, the windshield 18 can have a second heating arrangement (not shown) between structural plies 28 and 30, e.g. glass or acrylic sheets, to prevent and/or to remove fog from inner surface 32 of the windshield 18. The number 32 also designates inner surface of the structural ply 24. The inner surface 22 of the outer ply 24 is laminated to outer surface 34 of the structural ply 28 by an interlayer sheet 36, e.g. a vinyl interlayer sheet, and the structural plies 28 and 30 are laminated together by an interlayer sheet 38, e.g. a urethane interlayer sheet. As can be appreciated, the invention is not limited to the construction of the windshield 18 and any of the constructions of aircraft transparencies, e.g. windshields used in the art can be used in the practice of the invention. Further, the invention is not limited to the number of glass sheets, plastic sheets, vinyl interlayers or urethane interlayers that make up the windshield 18 and the windshield 18 can have any number of sheets and/or interlayers.

Figure 2:
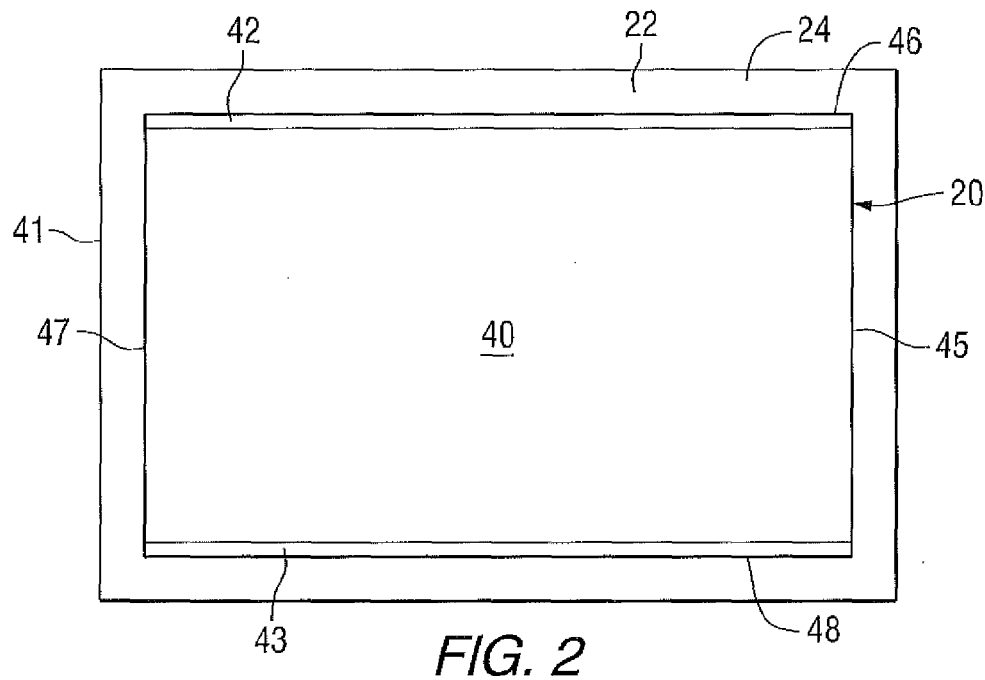
FIG. 2 is a plan view of a heating arrangement of an aircraft transparency having an electrically conductive coating that can be segmented in accordance to the teachings of the invention.
Figure 3:
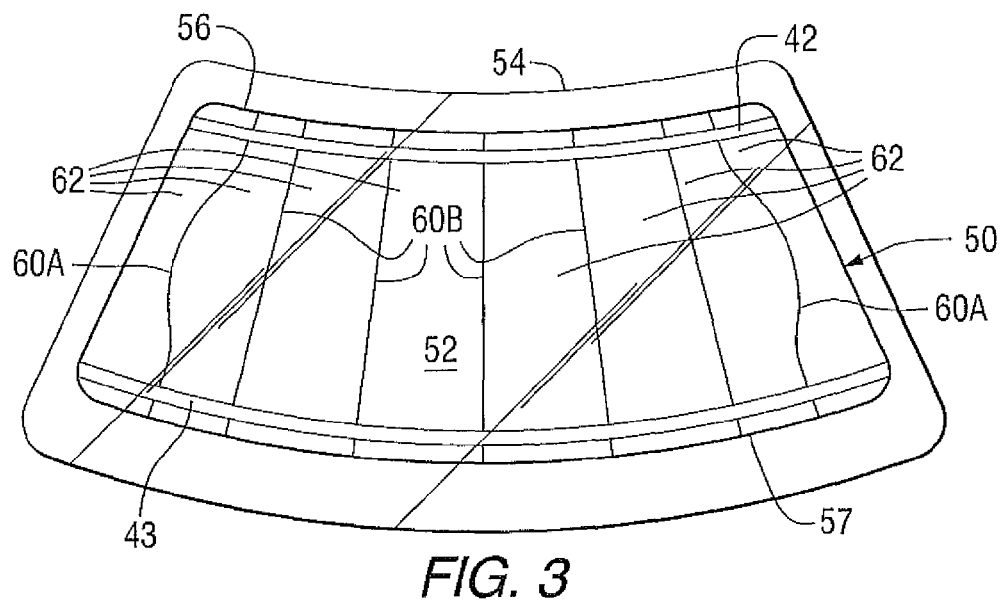
FIG. 3 is a plan view of another embodiment of a heating arrangement of an aircraft transparency having an electrically conductive coating segmented in accordance to the teachings of the invention.
Figure 4:
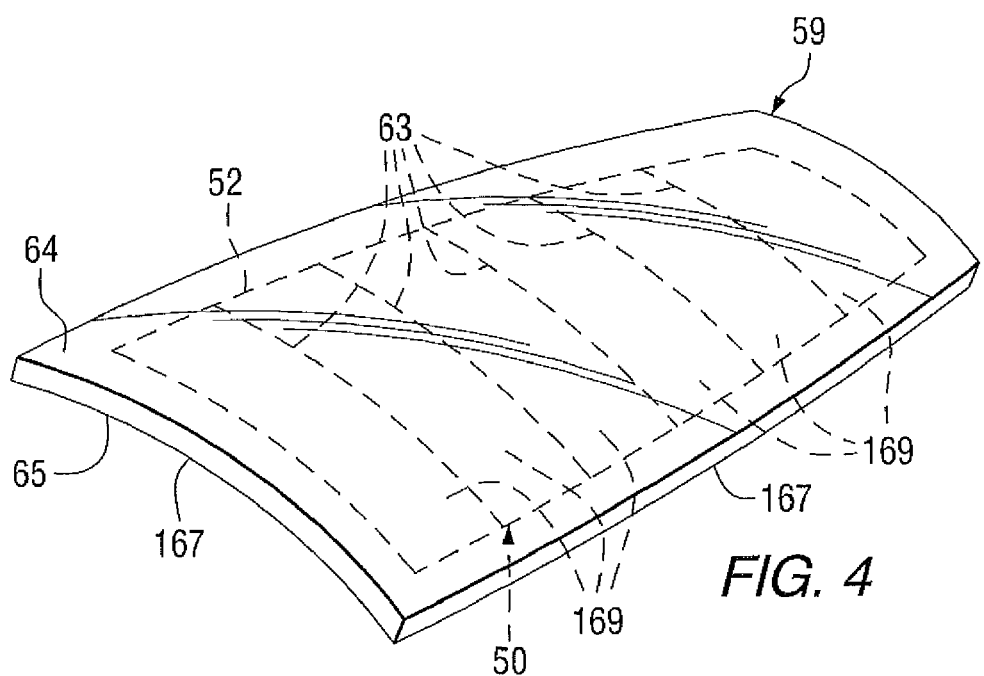
FIG. 4 is a prospective view of an embodiment of a shaped aircraft transparency having a glass electrically conductive coating segmented in accordance to the teachings of the invention.

With reference to FIG. 2, in one non-limiting embodiment of the invention, the heating arrangement 20 includes an electrically conductive coating or layer 40, e.g. one or more films between a pair of bus bars 42 and 43 connected by wires (not shown) to an electrical power source (not shown). The electrically conductive coating 40 shown in FIG. 2 is applied over a flat sheet 41 having a rectangular shape with linear sides 45-48. With reference to FIG. 3, in another non-limiting embodiment of the invention, heating arrangement 50 includes electrically conductive coating 52 on flat sheet 54. Sides 56 and 57 of the coating 52 shown in FIG. 3 are non-linear or curved. With reference to FIG. 4 there is shown a curved sheet 59 having the electrically conductive coating 52. As discussed above, the non-linear or curved sides of an electrically conductive coating such as the coating 52 (see FIGS. 3 and 4) prevent uniform distribution of the current passing through the coating 52 between the bus bars 42 and 43 (bus bars only shown in FIGS. 2 and 3).

The invention is not limited to the design and/or construction of the heating arrangements 20 (FIG. 2) and 50 (FIGS. 3 and 4), and any electrically conductive heating arrangement used in the art to heat a surface of a sheet to melt ice on, and/or remove fog from, the surface of the sheet can be used in the practice of the invention. Further, the invention is not limited to the composition of the conductive coating 40 (FIG. 2) or 52 (FIGS. 3 and 4), for example and not limiting to the invention, the conductive coatings 40 and 52 can be made from any suitable electrically conductive material. Non-limiting embodiments of conductive coatings that can be used in the practice of the invention include, but are not limited to a pyrolytic deposited fluorine doped tin oxide film of the type sold by PPG Industries, Inc. under the registered trademark NESA®; a magnetron sputter deposited tin doped indium oxide film of the type sold by PPG Industries, Inc under the registered trademark NESATRON®; a coating made up of one or more magnetron sputter deposited films, the films including, but not limited to a metal film, e.g. silver, between metal oxide films (dielectric films), e.g. zinc oxide and/or zinc stannate, each of which can be sequentially applied over one another by magnetron sputtering, e.g. as disclosed in U.S. Pat. Nos. 4,610,771; 4,806,220 and 5,821,001, the disclosures of which are hereby incorporated by reference.

The invention is not limited to the design and/or construction of the bus bars 42 and 43 (FIGS. 2 and 3) and any of the types of bus bars used in the art can be used in the practice of the invention. Examples of bus bars that can be used in the practice of the invention, include, but not limited to, the types disclosed in U.S. Pat. Nos. 4,623,389; 4,894,513; 4,994,650; 4,902875, and 6,471,360, which patents are hereby incorporated by reference.

In the practice of the invention, one or more cutting or separation lines 60A (non-linear lines) and 60B (straight lines) are imposed in the electrically conductive coating to separate the coating 52 (see FIG. 3) into segments 62, and to electrically isolate the adjacent segments 62 between the bus bars 42 and 43 from one another to provide a more uniform distribution of current through the coating 52 and to provide for a more uniform temperature distribution across the surface of the sheet 54. As is appreciated, the practice of the invention is not limited to segmenting the coating 52 to provide a more uniform heating of the sheet 54, and the invention can be practiced to segment the coating 52 to provide segments 62 having different voltages when current moves through the segments to heat selected portions of the sheet to different temperatures, or to attain surface temperatures at different rates of time, as is known in the art.

Figure 5:
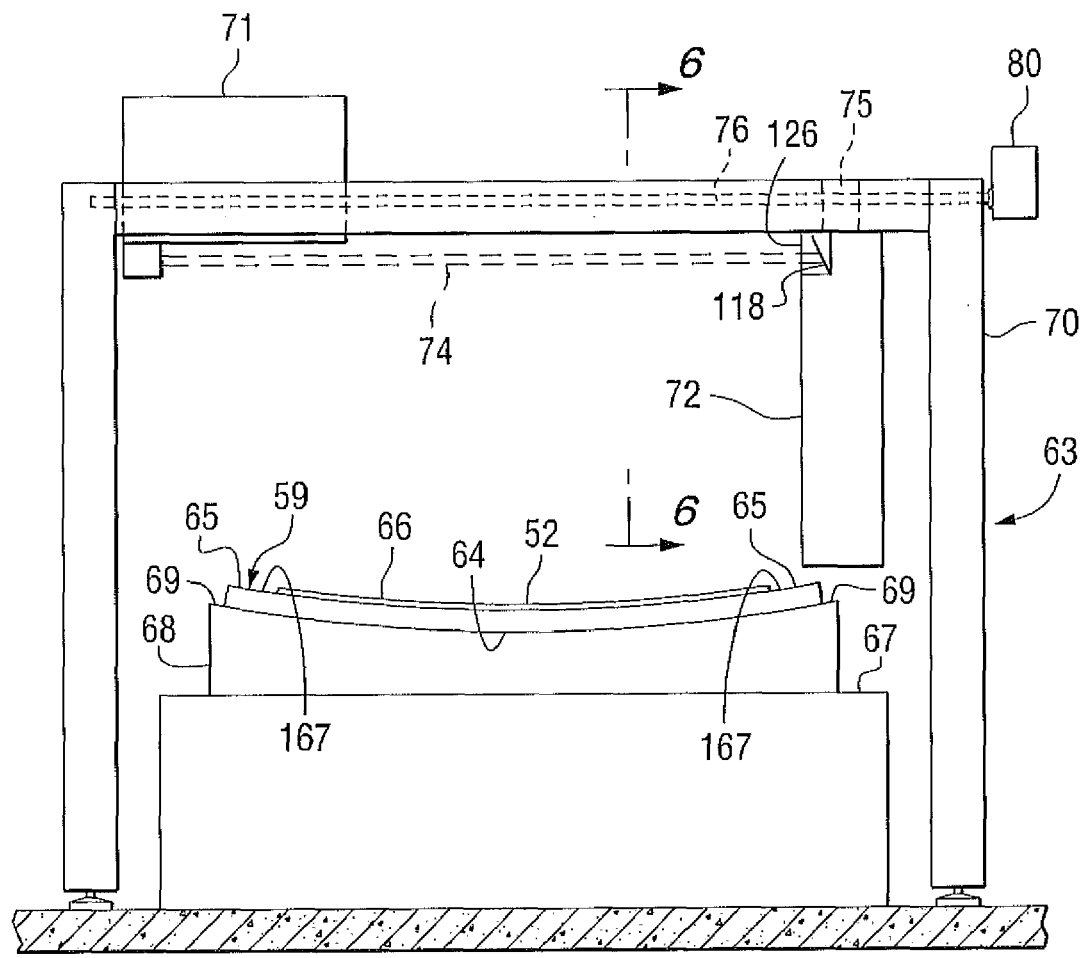
FIG. 5 is a work station for imposing cut lines or separation lines in an electrically conductive coating in accordance to the teachings of the invention.

Shown in FIG. 5 is a work station 63 that includes a non-limiting embodiment of the invention to maintain cutting surface of a shaping member, e.g. focal point of a laser beam, at a fixed distance from a reference surface. In one non-limiting embodiment of the invention, the reference surface is surface 66 of the coating 52, (see FIG. 5). However, as is appreciated, the reference surface can be any of the surfaces of the sheet 59. In the following discussion, a non-limiting embodiment of the invention is practiced to impose one or more cut lines or a separation lines in the coating 52 prior to positioning the bus bars over the coating, and prior to laminating the sheet 59 to the structural ply 28 to provide the windshield 18 (see FIG. 1). The invention, however, is not limited thereto, and the electrically conductive coating 52 can be cut into segments after the sheet 59 is laminated to the structural ply 28.

The work station 63 includes a work table 67 having a sheet support 68. In the non-limiting embodiment of the invention under discussion, the surface 65 of the sheet 59 faces away from the sheet support 68, and the uncoated surface 64 of the sheet 59 is supported on surface 69 of the sheet support 68.

The sheet 59 is secured on the sheet support 68 of worktable 67 in any convenient or usual manner, e.g. but not limited to retaining clips (not shown). Preferably, the surface 69 of the sheet support 68 has a non-abrasive coating, e.g. a TEFLON® coated surface to prevent marring, or other surface damage to the surface 64 of the sheet 59. As can be appreciated, when the sheet to be supported on the sheet support has a fixed shape, the shape of the sheet does not have to match the contour of the support surface 69. However, when the sheet does not have a fixed shape, e.g. the sheet is flexible, the contour of the support surface 69 preferably has the desired contour of the ultimate shape of the sheet it is supporting. The work table 67 can include facilities (not shown) to move the support surface, and the sheet 59 in any direction, or the work table 67 can be stationary to maintain the sheet 59 in a fixed position. Further, the invention is not limited to supporting the surface 64 of the sheet 59 on the surface 69 of the sheet support 68, and the invention contemplates mounting the surface 66 of the coating 52 on the surface 69 of the sheet support 68. Still further, the invention contemplates mounting the worktable 64 on vibration damping mounts (not shown) to prevent floor vibrations from vibrating the worktable 64 and the sheet 59.

Figure 6:
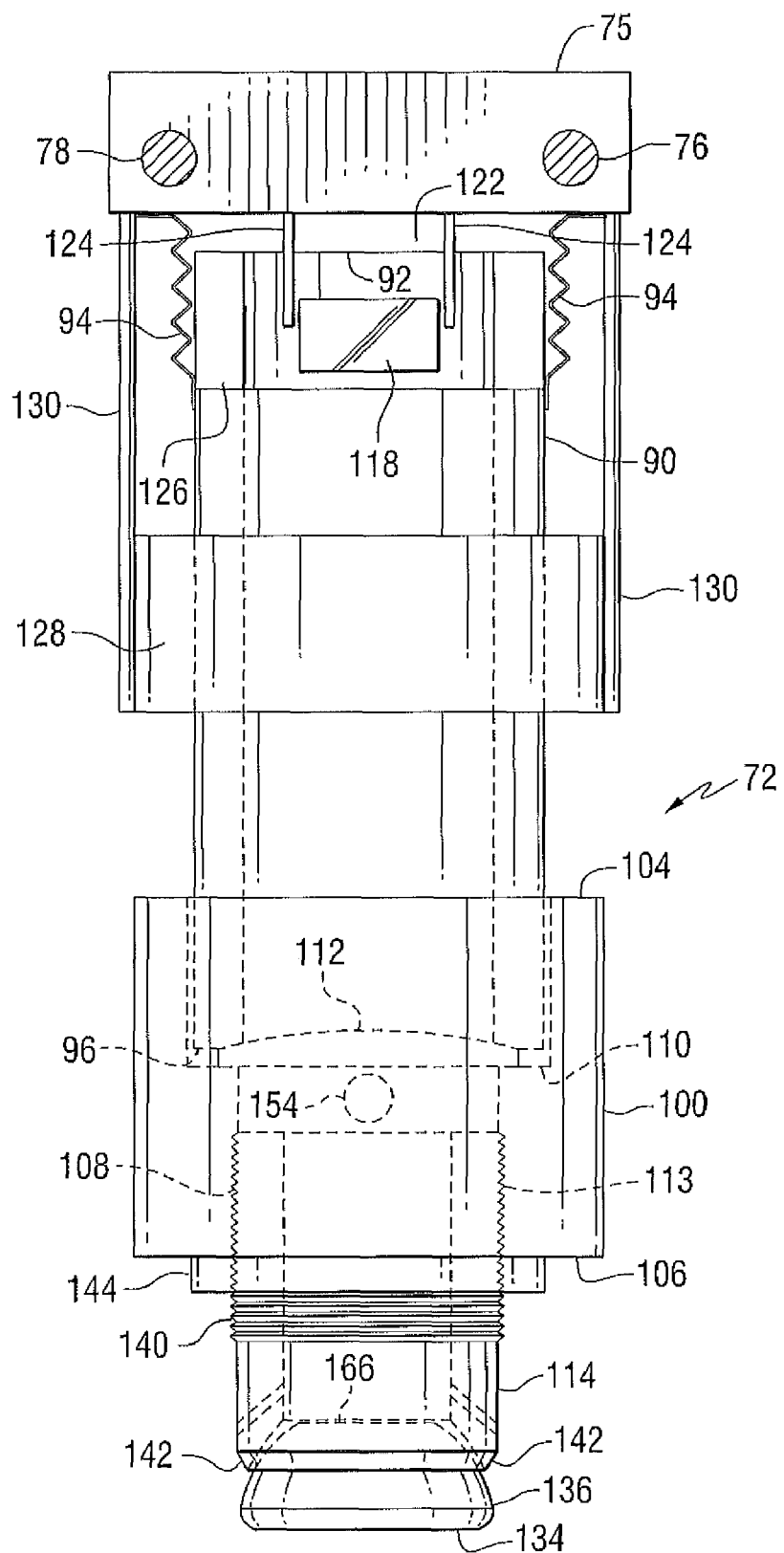
FIG. 6 is an elevated side view of a device of the invention for imposing cut lines or separation lines in an electrically conductive coating in accordance to the teachings of the invention.

Mounted above and over the sheet support 68 of the worktable 67, on structural framework or gantry 70 is a laser system 71 and a non-limiting embodiment of a focusing system 72 of the invention (see also FIG. 6). The invention is not limited to the laser of the laser system 71. In the practice of the invention, the laser is selected to delete selected portions of the coating 52 so as to impose a separation line or a deletion line or a cut line 60A and/or 60B (FIG. 3) or 63 (FIG. 4) in the coating 52 without adversely effecting the substrate supporting the coating, e.g. the glass sheet 59. More specifically, in one non-limiting embodiment of the invention, the wavelength of the laser beam is selected such that the majority of the energy of the laser is absorbed by the electrically conductive element of the coatings 40 and 52 (see FIGS. 2-4), e.g. the silver layer of a multilayered, magnetron sputtered coating. The electrically conductive film layer is liquefied and resolidifies in the laser heated area in the form of spaced apart and isolated, microscopic globules that provide the desired electrical insulation between adjacent coating segments. In another non-limiting embodiment of the invention, the wavelength of the laser beam is selected so that laser energy is absorbed by the entire coating stack such that the coating is locally vaporized. The vaporized coating resolidifies as particles on the coating surface, which can be removed by subsequent cleaning of the coating surface. Non-limiting embodiments of the invention were practiced using a blue YAG laser-355 nanometer, Q-Switched, frequency multiplied and a YAG Laser, 1-Watt output power. One or more mirrors (not shown) were used to direct a laser beam 74 toward the focusing system 72 of the invention. The focusing system 72 is mounted on the gantry 70 for movement toward and away from the laser system 71, e.g. from right to left, and from left to right, as shown in FIG. 5, in any convenient manner. As is appreciated, the invention contemplates moving the focusing system 72 and the sheet support 68 relative to one another, e.g. but not limited to simultaneously moving the focusing system and the sheet support; maintaining the focusing system 72 stationary and moving the sheet support 68, and maintaining the sheet support 68 stationary and moving the focusing system 72.

With reference to FIGS. 5 and 6 as needed, in one non-limiting embodiment of the invention, a mounting block 75 (FIG. 6) is positioned on a pair of spaced threaded shafts 76 and 78 driven by stepper motor 80 (see FIG. 5). The focusing system 72 is mounted to the mounting block 75 in a manner discussed below. Rotating the shafts 76 and 78 in one direction moves the mounting block 75 and the focusing system 70 over the sheet support 68 and the work table 67 in a first direction toward the laser system 68 (see FIG. 5), and rotating the shafts 76 and 78 in the opposite direction moves the mounting block 75 and the focusing system 70 over the sheet support 68 and the work table 67 in a second direction away from the laser system 71.

Figure 7:
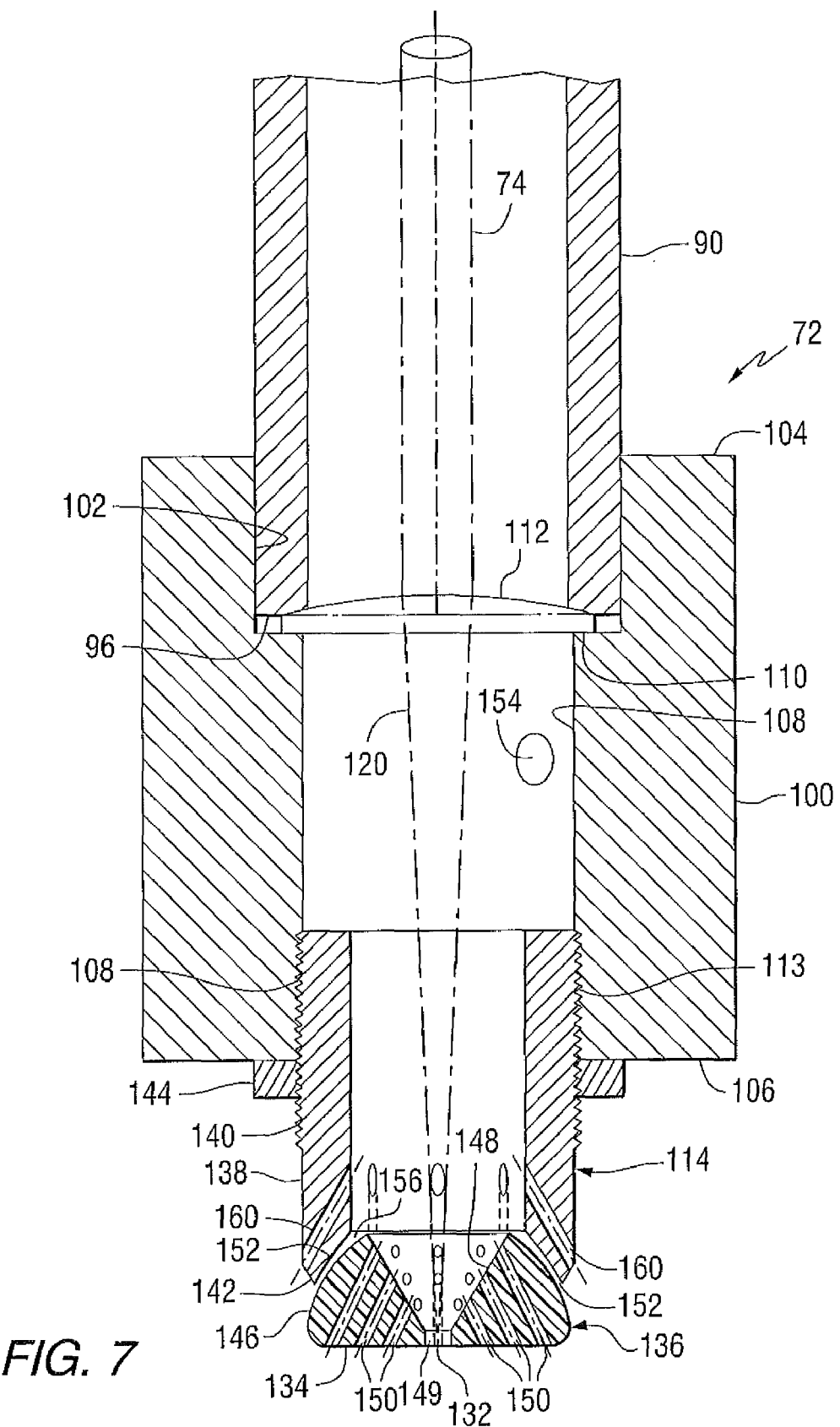
FIG. 7 is a cross sectional view of a lower half of the device shown in FIG. 6 showing the focusing system of the invention.
Figure 8:
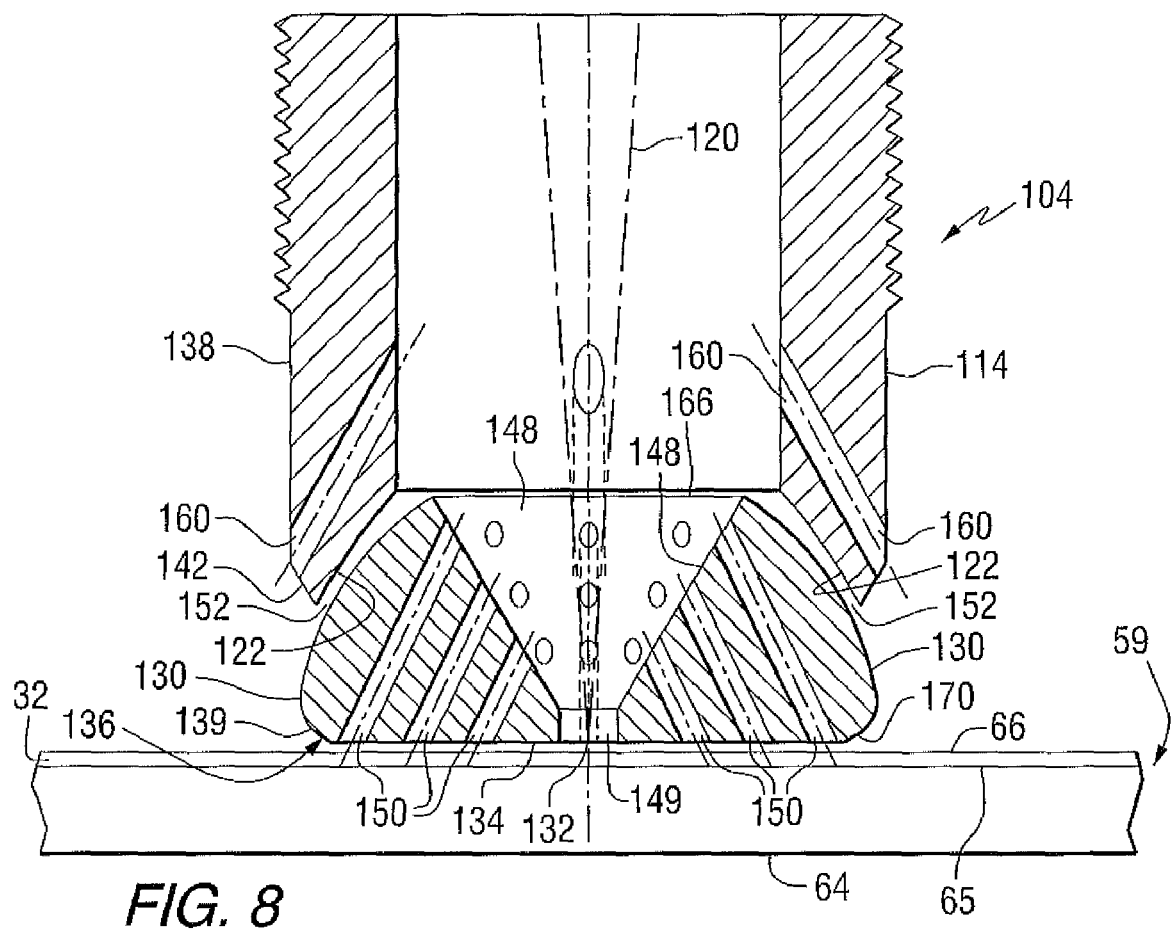
FIG. 8 is a cross sectional view of a lower portion of the device shown in FIG. 6 showing the surface follower and focusing adjustor of the invention.

With reference to FIGS. 6-8 as needed, in the non-limiting embodiment of the invention under discussion, the focusing system 72 of the invention includes a hollow tube 90 having one end 92 connected to the mounting block 75 by constant force springs 94. As can be appreciated, the invention is not limited to any one type of constant force spring. The invention was practiced using constant force springs of the type sold by Mc Master Carr having an office in Santa Fe Springs, Calif. Opposite end 96 of the tube 90 is securely mounted in connector block 100. The connector block 100 has a first passageway 102 (see FIG. 7) extending from end 104 of the block 100 toward opposite end 106 of the block 100 and has a second passageway 108 extending from the end 106 of the block 100 toward the end 104. The inside diameter of the first passageway 102 is greater than the inside diameter of the second passageway 108 to provide a lens support ledge 110 at the juncture of the passageways 102 and 108. The inside diameter of the first passageway 102 and the outside diameter of the tube 90 are sized such that the end 96 of the tube 90 is securely mounted in the first passageway 102 of the connector block 100 to capture focusing lens 112 between the end 96 of the tube 90 and the lens support ledge 110. A 60 mm focusing lens was used in the practice of the invention. The second passageway 108 of the connector block 100 has internal threads 113 to receive focus adjuster 114. As can be appreciated the invention is not limited to the manner in which the end 96 of the tube 90 is securely fixed in the first passageway 102 of the connector block 100, and any of the techniques known in the art, e.g. a friction fit, an adhesive, welding or threaded surfaces can be used in the practice of the invention.

With reference to FIGS. 5-7 as needed, the laser beam 74 is reflected by a reflecting surface, e.g. a mirror 118, into the tube 90 (see FIGS. 5 and 6). The laser beam 74 passes through the tube 90, through the focusing lens 112 and enters the focusing adjuster 114 as a converging laser beam 120, or a focused laser beam 120 (see FIGS. 6 and 7). The mirror 118 can be mounted at an angle to the inner surface 122 of the tube 90, or can be fixedly mounted at an angle to the mounting block 75 in any convenient manner. In the non-limiting practice of the invention, the mirror was mounted on struts 124 affixed to the block 75 (see FIG. 6). When the mirror 118 is mounted to extend into the end 92 of the tube 90, a section of the end 92 of the tube 90 is cut away to provide a window 126 to pass the laser beam 74 to the mirror (see FIG. 5). In another non-limiting embodiment of the invention, the mirror 118 and the tube 90 are positioned such that the mirror 118 is not within the end 92 of the tube 90. Rather the tube 90 is positioned below the mirror 118 so as not to interfere with the laser beam 74 from the laser 71. In the non-limiting embodiment of the invention under discussion, the mirror 118 and the lens 112 are aligned to direct the laser beam 74 through the center portion of the focusing lens 112 when the focusing system 72 is stationary and/or as the focusing system 72 moves over the sheet support 68 (see FIG. 7) and the focusing system moves toward and away from the mounting block 75 in a manner discussed below. With reference to FIG. 6, the focusing system 72 is prevented from swinging as it moves over the sheet support 68 by positioning the tube 90 in a sleeve 128 secured to the mounting block 75 by struts 130. In one non-limiting embodiment of the invention, inner surface of the sleeve 128 is a non-friction surface. The invention was practiced by providing an air bearing between the sleeve 128 and the tube 90 to freely move the tube 90 toward and away from the mounting block 75.

With reference to FIG. 7, the discussion is now directed to the focusing adjuster 114 of the invention, which in one non-limiting embodiment of the invention is used to set the focused point 132 of the converging laser beam 120 at a predetermined distance from surface 134 of puck or surface follower 136. In the non-limiting embodiment of the invention under discussion, the focusing adjuster 114 includes a hollow conduit 138 having an outer threaded end 140 to thread the focusing adjuster 114 in the end 106, and into the second passageway 108, of the lens support block 100. With this arrangement, rotating the focusing adjuster 114 in a first direction moves the adjuster 114 into the lens support block 100 to increase the distance between the focal point 132 of the converging laser beam 120 and end 142 of the focusing adjuster 114 and rotating the focusing adjuster 114 in an opposite second direction moves the focusing adjuster 114 out of the lens support block 100 to decrease the distance between the focal point 132 of the converging laser beam 120 and end 142 of the focusing adjuster 114. An internally threaded washer 144 was threaded on the focusing adjuster 114 and engaged the second end 106 of the lens support block 100 to secure the focusing adjuster 114 in a set position with the focal point 132 of the converging laser beam 120 a predetermined spaced distance from the second end 142 of the focusing adjuster 114.

Figure 9:
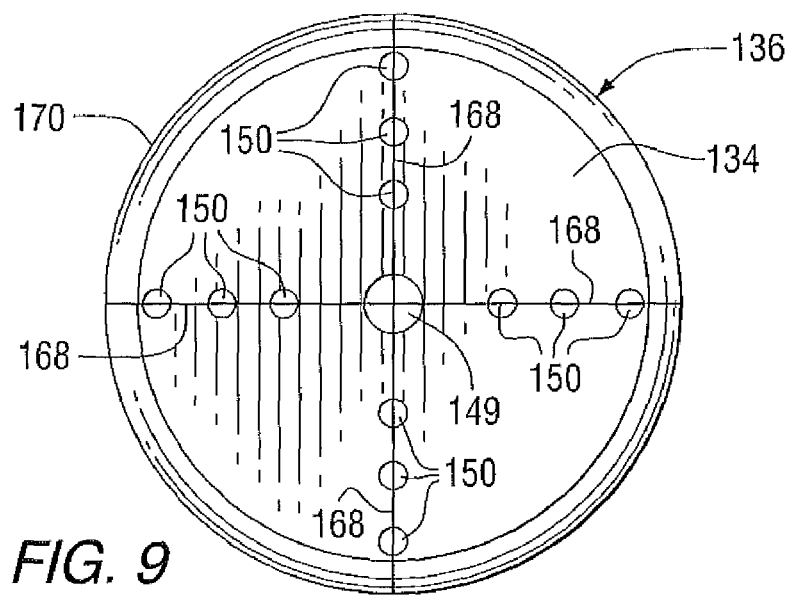
FIG. 9 is a plan view of the base of the surface follower of the invention.

The air puck or surface follower 136 has a hemispherical outer shape 146, a cone shaped cavity 148, having an exit hole 149 at the surface 134 of the puck 136 and a plurality of passageways 150 having an exit at the surface 134 of the puck 136 (see FIGS. 7-9). Inner surface 152 of the end 142 of the conduit 138 of the focusing adjuster 114 is an outward sloping surface to receive the hemispherical outer shape 146 of the puck 136. A gas, e.g. air or nitrogen is moved under pressure into the lens support block 100 through opening 154. The focusing lens 112 blocks the flow of the gas into the tube 90, and the gas moves through the conduit 138 of the focusing adjuster 114 and out of the end 142 of the focusing adjuster 114. The gas exits the focusing adjuster 114, by moving though space 156 between outer surface 146 of the air puck 136 and the inner surface 152 of the focusing adjuster 114, and through the opening 149 and the passageways 150 of the air puck 136. The gas passing through the space 152 provides a first air or gas bearing for the air puck 136 to freely move in the end 142 of the focusing adjuster 114. The gas passing through the opening 149 and the exit ends of the passageways 150 of the air puck 114 provides a second gas or air bearing between the surface 134 of the air puck 114 and the surface 66 of the coating 52 on the surface 65 of the sheet 59 (see FIG. 5).

In one non-limiting embodiment of the invention, with the gas moving into the lens support block 100 to provide the first and the second gas bearings, the focusing adjuster 114 is rotated to position the focal point 1 32 of the converging laser beam 120 a predetermined distance from a reference point, e.g. the surface 66 of the coating 52 on the sheet 59, or from the second end 142 of the focusing adjuster 114 by rotating the focus adjuster 114 as discussed above. More particularly, rotating the focus adjuster 114 in the first direction moves the focal point 132 of the laser beam away from the surface 66 of the coating 52 (see FIG. 8), and rotating the focus adjuster 114 in the second direction moves the surface 134 of the air puck 136 away from the surface 66 of the coating 52 to move the surface 134 of the air puck 36 toward the surface 66 of the coating 52 to move the focal point 132 toward the surface 66 of the coating 52.

In the non-limiting embodiment of the invention under discussion, the tube 90 of the focusing system 72 of the invention is connected to the mounting block 75 by the constant force springs 94 (shown only in FIG. 6) such that the focusing system 72 can be moved toward and away from the mounting block 75 by the movement of the air puck 136 over the shaped surface 66 of the coating 52 of the sheet 59. The air puck 136 is provided with the center opening 149 and with the conical shaped cavity 148 (see FIGS. 7 and 8) so that the converging laser beam 120 passes through the center opening 149 of the air puck 136 as the air puck pivots and/or rotates in the end 142 of the conduit 138 of the focus adjuster 114 (see FIG. 8) in response to the changes in the surface contour of the coating 52 and the sheet 59.

In a preferred practice of the invention, the conduit 1 38 of the focusing adjuster 114 is provided with passageways 160 (see FIG. 8) adjacent the end 142 of the focusing adjuster 136. The gas moved into the lens support block 100 through the opening 154 (see FIG. 7) moves through the passageways 160 to provide an air curtain around the air puck 136, or in front of the moving air puck 136 to blow particles (not shown) on the surface 66 of the coating 52 away from the path of the air puck 136 to avoid trapping particles between the surface 134 of the air puck 136 and the surface 66 of the coating 52, which trapped particles can scratch the surface 66 of the coating 52 as the air puck 136 and trapped particles move over the surface of the coating. Although not limiting to the invention, the gas is a dry gas, and in the practice of the invention, the gas was nitrogen. A dry gas is preferred to blow the particles from the surface 66 because moisture in the gas can adhere the particles to the surface 66 of the coating 52.

The pressure of the gas moving through the passageways 150 and the opening 149 of the air puck 136, and through the passageways 160 of the focus adjuster 114 are sufficient (1) to maintain the surface 134 of the air puck 136 a constant distance from the surface 66 of the coating 52 on the sheet 59 (see FIG. 8), (2) to maintain the surface 152 of the focusing adjuster 114 a constant distance from the hemispherical surface 156 of the puck 136 (see FIG. 8), and (3) to pass gas through the passageways 160 at the end 142 of the focusing adjuster 114 to provide an air curtain around the puck 136. With this arrangement, movement of the air puck 136 over the surface 66 of the coating 52 on the shaped sheet 59 moves the focusing system 70 toward the mounting block 75 (see FIG. 6) as the air puck 136 moves over convex or raised portions of the surface 66 of the coating 52, and moves focusing system 70 away from the mounting block 75 as the air puck 136 moves over the concave or depressed portions of the surface 66 of the coating 52. In this manner, the surface 134 of the air puck 136 is maintained at a constant spaced distance from the surface 66 (a reference surface) of the coating 52 on the sheet 59, and the focal point 132 of the converging laser beam 120 (the cutting edge) is maintained at a fixed spaced distance from the surface 66 (the reference surface) to impose cut lines or separation lines 60A, 60 B (FIG. 3) and 63 (FIG. 4) in the coating 52 having a constant width at a constant distance from the reference surface.

In one non-limiting embodiment of the invention, the width of the cut lines 60A, 60B and 63 to be cut into the coating 52 (see FIGS. 3 and 4) has a width of about 0.0015 inches (0.016 mm). The distance between the surface 134 of the air puck 136 and the surface 66 of the coating 52 on the surface 65 of the sheet 59 was about 0.004 inches (0.10 mm). The air puck was a plastic semi-spherically shaped member having a ¾ inch (19.05 mm) diameter and having a flat surface 166 opposite to the surface 134 of the air puck 136 (see FIG. 6). With reference to FIG. 9, the passageways 150 had a diameter of 0.062 inch (1.57 mm) and were arranged to have two passageways on each leg 168 of an "X" pattern, and the center opening 149 had a diameter of 0.125 inch (3.18 mm). The passageways 150 on each leg 168 of the "X" pattern are at the ⅓ point of the leg 168 of the "X". The centerline of each of the passageways 150, and of the center opening 149, converge with one another at a distance of ¾ inch (19.05 mm) from the surface 134 of the air puck 136. The cone shaped cavity 148 (see FIG. 8) had a diameter of 0.352 inch (8.9 mm) at the surface 166 of the air puck 136 and sloping walls to meet at the center opening 149 at a spaced distance of 0.032 inch (0.81 mm) from the surface 134 of the air puck 136. The center opening 149 had a diameter of 0.125 inch (3.18 mm). The air puck has a thickness as measured between the surfaces 134 and 166 (see FIG. 8) of 0.331 inch (8.41 mm). Edge 170 of the surface 142 of the air puck 136 was beveled (see FIG. 8) to eliminate sharp edges.

It should be appreciated that the passageways 150 can be positioned along surface 134 of the air puck 136 in desired configuration. Furthermore, in another non-limiting embedment of the invention, passageways 150 can be eliminated and body of puck 136 can be hollowed out to provide the passageway for the gas. In still another non-limiting embodiment of the invention, passageways 150 can be eliminated so that the puck 136 includes only the cone 148 and central opening 149.

The conduit 138 of the focus adjuster 114 had a length of 1.75 inch (44.45 mm) and a wall thickness of 0.125 inch (3.18 mm). Eight passageways 160 were equally spaced around the end 142 of the conduit 138. The passageways 160 had a diameter of 0.096 inch (2.44 mm), and the centerline of the passageways 160 subtended a 45 degree angle with the outer surface of the conduit 138. The sloping inner walls 122 (see FIG. 8) at the end 142 of the conduit 138 of the focus adjuster 114 were contoured to the surface 146 of the air puck 136 (see FIG. 8). As can be appreciate the invention is not limited to the number of passageways 150 in the air puck, or the number of passageways 160 in the conduit 138 of the focus adjuster 114.

In the non-limiting embodiment of the invention under discussion, the constant force springs 94 (see FIG. 6) limited the downward force to 6-14 ounces of pressure on the air puck 136. The nitrogen gas pressure coming into the lens support block 100 through the gas inlet 154 was 60 pounds per square inches (413.64 Pascal). With the above arrangement, the air puck 136 was space 0.004 inches (0.10 mm) from the surface 66 of the coating 52 on the sheet 59 (see FIG. 8) and the spacing 156 between the hemispherical surface 146 of the air puck 136 and inner sloped surfaces 152 at the end 142 of the conduit 138 of the focus adjuster 114 was 0.004 inches (0.10 mm) (see FIG. 8). The focusing adjuster 114 was positioned to provide for the focal point 132 of the converging laser beam 120 to be at the surface 134 of the air puck 136.

In a non-limiting embodiment of the invention, the sheet 59 was supported on the sheet support 68 with the surface 66 of the coating 52 of the sheet 59 facing the air puck 136 and the focusing system 72. The stepper motor 80 was energized to position the focusing system 72 at an edge of the sheet 59. The focusing system 72 was moved upward toward the mounting block 75 and the air puck 136 was held in the end 142 of the conduit 138 of the focusing adjuster 114 as the focusing system 72 was lowered to place the air puck on the surface 66 of the sheet 59. Dry nitrogen gas was moved through the gas inlet 154 of the lens support block 100 and flows toward and through the end 142 of the conduit 138 of the focusing adjuster 114, moving through the passageways 160 in the end 142 of the conduit 138, the space 152 between the air puck 136 and the end 142 of the conduit 138, and the passageways 150 and the center opening 149 of the air puck 136. The laser system 71 was energized to impinge the laser beam 74 onto the mirror 118. The mirror 118 reflected the laser beam through the tube 90 and the focusing lens 112 to converge the laser beam at the focal point 132. The focusing adjuster 114 was rotated to provide the focal point 132 of the laser beam at the surface 134 of the air puck 136. The stepper motor 80 was energized to move the focusing system 72 and the air puck 136 over the coated surface 66, e.g. from right to left as viewed in FIG. 5 to impose a cut line 60A, 60 B and/or 63 in the coating 52 (see FIGS. 3 and 4). It is to be noted that the orientation of the sheet 59 shown in FIG. 5 is opposite to the orientation of the sheet 59 shown in FIG. 4. When the focusing system 70 reached the opposite end of the coating 52 and moved onto the uncoated marginal edges 167 (see FIG. 5) of the sheet 59, the laser system is de-energized and the support table 64 is moved along a path normal to the path of the focusing system for a distance equal to a width of a coating segment 169 (see FIG. 4). The drive of the stepper motor is reversed to move the focusing system 70 from left to right as viewed in FIG. 5 to impose a second cut line 63 (see FIG. 4) in the coating 52.

In another non-limiting embodiment of the invention, when the focusing system 70 moves from the coating 52 to the uncoated marginal edges 167 (see FIG. 5) of the surface 52 of the sheet 59, the laser remains energized, and the support table 64 is moved along the path normal to the path of the focusing system for a distance equal to a width of a coating segment 169 and the focused point 132 of the laser beam moves along the uncoated marginal edges 167 of the sheet 59. The drive of the stepper motor is reversed to move the focusing system 70 from left to right as viewed in FIG. 5 to impose a second cut line 63 (see FIG. 4) in the coating. In still another non-limiting embodiment of the invention, when the focusing system 70 reaches the opposite end of the coating 52 and moves onto the uncoated marginal edges 167 (see FIG. 5) of the sheet 59, the laser system is de-energized and the drive of the stepper motor 80 reversed to move the focusing system 70 to its starting position. The support table 64 is moved along the path normal to the path of the focusing system for a distance equal to a width of a coating segment 169. The laser is energized and the focusing system 70 moved over the coating 52 to impose a second cut line 63 in the coating. In the practice of the invention, only one pass was made to impose the cut line 60A, 60B and/or 63 in the coating 52. The invention is not limited to the number of passes to impose a cut line 63 (see FIG. 4), and two or more passes can be made to impart a single cut line in the coating. As can be appreciated, the work table 67 and the focusing system 70 can be simultaneously moved to impose non-linear cut lines, e.g. but not limiting to the invention, cut lines similar to the cut lines 60A shown in FIG. 3.

Figure 10:
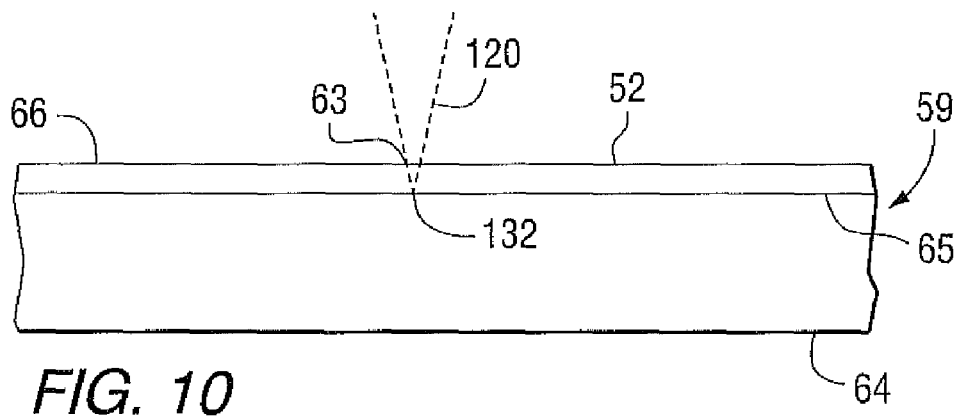
FIGS. 10-12 illustrate different depths of cut lines or separation lines in electrically conductive coatings.
Figure 11:
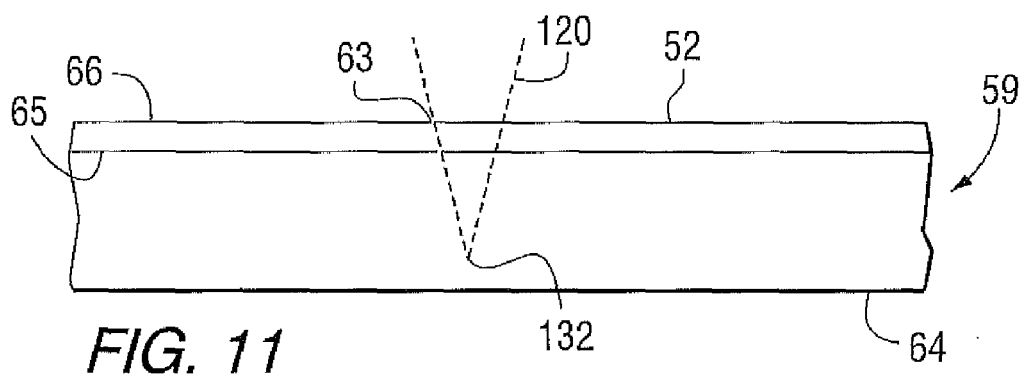

With reference to FIGS. 10 and 11, there is shown the glass sheet 59 having the electrically conductive coating 52 on the surface 65 of the glass sheet 59. In FIG. 10, the focal point 132 of the converging laser beams 120 is at the surface 65 of the glass sheet 59, and in FIG. 11, the focal point 132 of the converging laser beams 120 is between the surfaces 64 and 65 of the glass sheet 59. From FIGS. 10 and 11, it is noted that as the distance between the surface 66 of the coating 52 and the focal point 132 of the laser beam increases, the width of the cut line 63 increases, and that as the distance between the surface 66 of the coating 52 of the focal point 132 of the laser beam decreases, the width of the cut line 63 decreases. As is appreciated by those skilled in the art, the width of the line 63 imposed by the focal point 132 of the laser is constant as long as the focal point 132 is maintained at a fixed distance to a reference surface, e.g. the surface 66 of the coating 52, or one of the surfaces 64 and 65 of the glass sheet 59.

Figure 12:
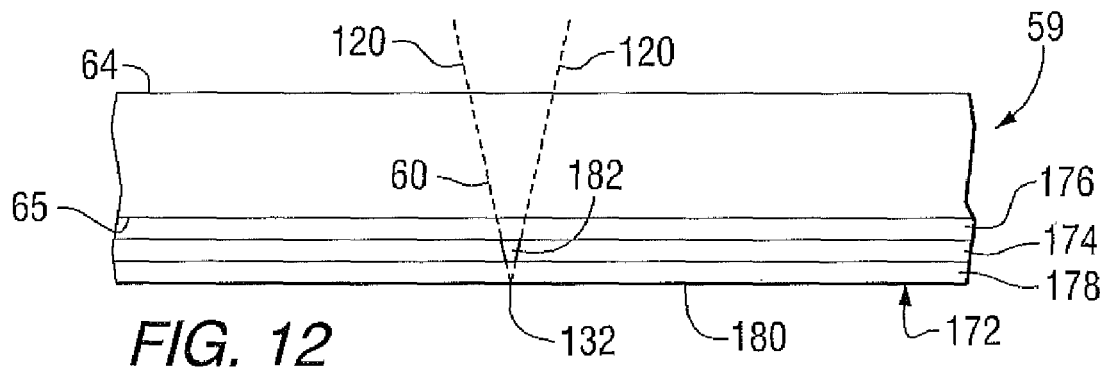

With reference to FIG. 12 coating 172 on the surface 65 of the glass sheet 59 includes an electrically conductive film 174, e.g. a silver film between a pair of dielectric films 176 and 178, e.g. films of zinc stannate. The dielectric film 176 is on the surface 65 of the glass sheet 59. In the non-limiting embodiment of the invention shown in FIG. 12, the converging laser beam 120 is directed through the uncoated surface 64 and the coated surface 65 of the glass sheet with the focal point 132 on outer surface 180 of the dielectric film 178. Converging laser beam 120 passes through the dielectric layers 176 and 178 and vaporizes a portion of the silver layer 174 to provide a void or cut line 182 in the silver film 174 to electrically isolate adjacent coating sections from each other.

It will be readily appreciated by those skilled in the art that modifications can be made to the non-limiting embodiments of the invention without departing from the concepts disclosed in the foregoing description. It is understood that various changes can be made without departing from the spirit of the invention as defined by the claimed subject matter which follows.

What is claimed is:

1. A device for maintaining cutting edge of a shaping member at a constant distance from a reference surface of an article as the cutting edge and the reference surface move relative to one another, the device comprising:

a hollow tube having a first end and an opposite second end, the second end of the tube having increasing wall thickness as distance from the second end of the tube increases to provide the second end of the tube with an internal concave end portion, wherein the second end of the tube and the cutting edge of the shaping member have a predetermined spaced relationship to one another;

a constant force applying arrangement for connecting the first end of the tube to a support member;

a surface follower having a first major surface and an opposite second major surface, the second major surface of the surface follower sized and shaped to fit into the internal concave end portion of the second end of the tube, the surface follower having a plurality of passageways, each of the passageways having an exit opening at the first major surface of the surface follower, wherein the surface follower and the tube are not connected to one another and are free to move toward and away from one another;

a solid plate mounted within the tube between the first end and the second end of the tube to provide the tube with a chamber between the second end of the tube and the plate;

an inlet for moving a gas into the chamber of the tube, wherein when the gas moves into the chamber and the tube is positioned to have the first major surface of the surface follower in facing relationship and adjacent to the reference surface, a first portion of the gas moves between outer surface portions of the second major surface of the surface follower and inner surface portions of the second end of the tube to provide a first gas bearing having a first thickness between outer surface portions of the second major surface of the surface follower and the inner surface portions of the second end of the tube, and a portion of the gas moves through the passageways of the surface follower to provide a second gas bearing having a second thickness between the first major surface of the surface follower and the reference surface, wherein the cutting edge of the shaping member is at a predetermined distance from the reference surface, and the surface follower and the tube are spaced from one another by the first gas bearing and out of contact with one another, and wherein curvatures of the reference surface of the article expand and contract the constant force arrangement to maintain the first and second thicknesses of the first and the second gas bearings, respectively, constant as the surface follower moves over the reference surface to maintain the cutting edge of the shaping member at a constant distance from the reference surface of the article.

2. The device according to claim 1 wherein the shaping member is a laser beam and the cutting edge is a focal point of the laser beam, and the tube further comprises a first hollow conduit having a first end and an opposite second end, and a second hollow conduit having a first end and an opposite second end, wherein the first end of the tube is the first end of the first conduit, and the second end of the tube is the second end of the second conduit, and the solid plate is a lens mounted in the first conduit to converge the laser beam to provide the focal point of the laser beam, and the second end of the first conduit and the first end of the second conduit are joined together and moveable relative to one another to increase or decrease the distance between the lens and the second end of the second conduit to change the predetermined relationship between the second end of the second conduit and the focal point of the laser beam.

3. The device according to claim 2 wherein body of the surface follower has a cavity having an entrance opening at the second major surface, and an exit opening at the first major surface, of the surface follower, wherein the laser beam passes through the lens toward the second end of the second conduit and through the exit opening of the cavity of the surface follower, wherein moving the second conduit in a first direction increases the spaced distance between the focal point of the laser beam and the second end of the second conduit, and moving the second conduit in a second direction deceases the spaced distance between the focal point of the laser and the second end of the second conduit.

4. The device according to claim 2, wherein the predetermined relationship between the second end of the second conduit and the focal point of the laser beam is a linear distance between the second end of the second conduit and the focal point of the laser beam.

5. The device according to claim 3 wherein the second end of the second conduit is a circular end, inner surface of the second end of the second conduit has an inner hemispherical shape, the first major surface of the surface follower is a flat major surface and the second major surface of the surface follower has a hemispherical outer shape, wherein diameter of the flat major surface of the surface follower is greater than inside diameter of the second end of the second conduit.

6. The device according to claim 3 comprising a second plurality of passageways through wall of the second conduit adjacent the second end of the second conduit, wherein a third portion of the gas moving through the second conduit moves through the second plurality of passageways to provide a gas curtain around the surface follower.

7. A work station for imposing a cut line in a surface of a work piece, the work station comprising:

a table having a work support surface to support the work piece with the surface of the work piece facing away from the work support surface;

a gantry mounted over the work support surface, the gantry comprising a support member, wherein the work support surface and the support member are moveable relative to one another and the work support surface and the support member are in facing relationship to one another, and a device for maintaining cutting edge of a shaping member at a constant distance from the surface of the work piece, the device comprising:

a hollow tube having a first end and an opposite second end, the second end of the tube having increasing wall thickness as distance from the second end of the tube increases to provide the second end of the tube with an internal concave end portion, wherein the second end of the tube and the cutting edge of the shaping member have a predetermined spaced relationship to one another;

a constant force applying arrangement connecting the first end of the tube to the support member with the second end of the tube in facing relationship to the work support surface;

a surface follower having a first major surface and an opposite second major surface, the second major surface of the surface follower sized and shaped to fit a portion of the second major surface of the surface follower into the internal concave end portion of the second end of the tube, the surface follower having a plurality of passageways having an exit opening at the first major surface of the surface follower, wherein the surface follower and the tube are not connected to one another and are free to move toward and away from one another;

a solid plate mounted within the tube between the first end and the second end of the tube to provide the tube with a chamber between the second end of the tube and the plate;

an inlet for moving a gas into the chamber of the tube, wherein when the gas moves into the chamber and the tube is positioned over the work support surface and the second major surface of the support follower is in the second end of the tube, a first portion of the gas moves between outer surface portions of the second major surface of the surface follower and inner surface portions at the second end of the tube to provide a first gas bearing having a first thickness between outer surface portions of the second major surface of the surface follower and inner surface portions at the second end of the tube, and a second portion of the gas moves through the passageways of the surface follower to provide a second gas bearing having a second thickness between the first major surface of the surface follower and the work support surface in facing relationship to the first major surface of the surface follower, wherein the cutting edge of the shaping member is at a predetermined distance from the work support surface in facing relationship to the first major surface of the surface follower, and the surface follower and the second end of the tube are spaced from one another by the first gas bearing and out of contact with one another, and wherein curvatures of the surface of the work piece expand and contract the constant force arrangement to maintain the first and second thicknesses of the first and the second gas bearings, respectively, constant as the surface follower moves over the major surface of the work piece to maintain the cutting edge of the shaping member at a constant distance from the surface of the work piece as the cutting edge moves along its path and as the surface follower moves over the surface of the work piece.

8. The work station according to claim 7 further comprising a sleeve fixedly mounted to the support member and surrounding outer surface of the tube wherein the tube slides within the sleeve toward and away from the support member as the constant force applying arrangement contracts and expands, respectively, and the sleeve limits sideward movement of the tube as the tube moves across the support surface.

9. The work station according to claim 8 wherein an air bearing is between the outer surface of the tube and inner surface of the sleeve.

10. The work station according to claim 7 wherein the shaping member is mounted on the gantry and is a laser, and the cutting edge is a focal point of a laser beam from the laser, and the tube further comprises a first hollow conduit having a first end and an opposite second end, and a second hollow conduit having a first end and an opposite second end, wherein the first end of the tube is the first end of the first conduit, and the second end of the tube is the second end of the second conduit, and the solid plate is a lens mounted in the first conduit to converge the laser beam to provide the focal point of the laser beam, and the second end of the first conduit and the first end of the second conduit are joined together and moveable relative to one another to increase or decrease the distance between the lens and the second end of the second conduit.

11. The work station according to claim 10 wherein the work piece comprises a sheet having a first major surface and an opposite second major surface and an electrically conductive film applied to the first major surface of the sheet, wherein the sheet is supported on the work support surface with the second major surface of the sheet on the work support surface.

12. The work station according to claim 10 wherein body of the surface follower has a cavity having an exit opening at the major surface of the surface follower, and the work station comprises a mirror mounted to the support member to direct the laser beam into the first conduit, through the lens toward the second end of the second conduit and through the exit opening of the cavity of the surface follower, wherein focal point of the laser beam is at a spaced distance from the second end of the second conduit, wherein moving the second conduit in a first direction increases the spaced distance between the focal point of the laser beam and the second end of the second conduit, and moving the second conduit in a second direction deceases the spaced distance between the focal point of the laser and the second end of the second conduit.

13. The device according to claim 12 wherein the second end of the second conduit is a circular end, inner surface of the second end of the second conduit is an outwardly sloped surface, the first major surface of the surface follower is a flat major surface and the second major surface of the surface follower is an outer a hemispherical shaped major surface, wherein diameter of the flat major surface of the surface follower is greater than inside diameter of the second end of the second conduit.

14. The work station according to claim 13 comprising a second plurality of passageways through wall of the second conduit adjacent the second end of the second conduit, wherein a third portion of the gas moving through the chamber moves through the second plurality of passageways to provide a gas curtain around the surface follower.

15. The work station according to claim 14 wherein the constant force applying arrangement is a constant force spring and comprising a sleeve fixedly mounted to the support member and surrounding outer surface of the tube, wherein the tube slides within the sleeve as the tube moves toward and away from the support member.

16. A method of imposing a cut line in a work piece, the work piece having a reference surface and the cut line having a predetermined depth as measured from the reference surface of the work piece, the method comprising:

providing a work table having a work surface;

providing a device for maintaining cutting edge of a shaping member at a constant distance from the surface of the work piece, the device comprising:

a shaping member having a cutting edge;

a hollow tube having a first end and a second end, the tube comprising a first hollow conduit having a first end and an opposite second end, and a second hollow conduit having a first end and an opposite second end, wherein the first end of the tube is the first end of the first conduit, and the second end of the tube is the second end of the second conduit, and the second end of the first conduit and the first end of the second conduit are joined together and moveable relative to one another to increase or decrease the length of the tube to position the cutting edge of the shaping member a predetermined distance from the second end of the tube;

wherein the second end of the tube has increasing wall thickness as distance from the second end of the tube increases to provide the second end of the tube with an internal concave end portion;

a constant force applying arrangement connecting the first end of the tube to a support member and the second end of the tube in facing relationship to the work support surface; and a surface follower having a first major surface and an opposite second major surface, the second major surface of the surface follower sized and shaped to fit a portion of the second major surface of the surface follower into the internal concave end portion of the second end of the tube, the surface follower having a plurality of passageways having an exit opening at the first major surface of the surface follower, wherein the surface follower and the tube are not connected to one another and are free to move toward and away from one another;

securing the work piece on the work surface;

positioning the second major surface of the surface follower in the second end of the tube;

moving a gas into the second conduit the tube to provide a first gas bearing having a first thickness between outer surface portions of the second major surface of the surface follower and inner surface portions at the second end of the tube, and to provide a second gas bearing having a second thickness between the first major surface of the surface follower and the reference surface of the work piece;

moving the second conduit relative to the first conduit to position the cutting edge of the shaping member at a predetermined spaced distance to the second end of the tube, and moving the device relative to the work piece to impose a cut line in the work piece having a predetermined depth as measured from the reference surface.

17. The method according to claim 16 wherein the work piece comprises a shaped glass sheet having an electrically conductive coating over a major surface of the glass sheet, wherein the reference surface is a surface of the coating and the cut line is imposed in the coating, and the thickness of the first and second air bearing remain constant as the surface follower moves over the reference surface.

18. The method according to claim 17 wherein the shaping member is a laser beam and the cutting edge is the focal point of the laser bean and the cut line is imposed in the electrically conductive coating by simultaneously moving the laser beam over the coating and moving the surface follower over the surface of the coating.

19. The method according to claim 18 wherein body of the surface follower has a cavity having an exit opening at the major surface of the surface follower, and further comprising directing a converging laser beam toward and into the cavity of the surface follower and moving the second conduit relative to the first conduit to position the focal point of the laser beam at a spaced distance from major surface of the surface follower or at the predetermined spaced distance from the second end of the tube.

* * * * *